(12) United States Patent
Eisenfeld

(10) Patent No.: US 12,124,037 B2
(45) Date of Patent: Oct. 22, 2024

(54) COMPOUND LIGHT-GUIDE OPTICAL ELEMENTS

(71) Applicant: Lumus Ltd., Ness Ziona (IL)

(72) Inventor: Tsion Eisenfeld, Ashkelon (IL)

(73) Assignee: LUMUS LTD., Ness Ziona (IL)

( * ) Notice: Subject to any disclaimer, the term of this patent is extended or adjusted under 35 U.S.C. 154(b) by 228 days.

(21) Appl. No.: 17/794,966

(22) PCT Filed: May 24, 2021

(86) PCT No.: PCT/IL2021/050608
§ 371 (c)(1),
(2) Date: Jul. 24, 2022

(87) PCT Pub. No.: WO2021/240513
PCT Pub. Date: Dec. 2, 2021

(65) Prior Publication Data
US 2022/0390747 A1    Dec. 8, 2022

Related U.S. Application Data

(60) Provisional application No. 63/029,496, filed on May 24, 2020.

(51) Int. Cl.
G02B 27/01    (2006.01)
F21V 8/00    (2006.01)
G02B 27/00    (2006.01)

(52) U.S. Cl.
CPC ....... *G02B 27/0172* (2013.01); *G02B 6/0015* (2013.01); *G02B 6/0035* (2013.01); *G02B 27/0081* (2013.01)

(58) Field of Classification Search
CPC ...... G02B 6/00; G02B 6/0015; G02B 6/0035; G02B 27/0172; G02B 27/0081; G02B 2027/0125; G02B 2027/0178
See application file for complete search history.

(56) References Cited

U.S. PATENT DOCUMENTS 2,748,659 A    6/1956    Geffcken et al.
2,795,069 A    6/1957    Hardesty
(Continued)

FOREIGN PATENT DOCUMENTS

CN    101542346    9/2009
CN    103837988    6/2014
(Continued)

OTHER PUBLICATIONS

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.
Chin-Hao Chang el al: "Nanostrulured gradient-index anlireflection diffractive optics", Optics Letters, vol. 36, No. 12, Jun. 5, 2011, p. 2354.
(Continued)

*Primary Examiner* — Michael P Mooney
(74) *Attorney, Agent, or Firm* — Rivka Friedman

(57) ABSTRACT

An optical system for directing image illumination injected at a coupling-in region towards a user for viewing includes a light-guide optical element (LOE) (12) with a pair of parallel major external surfaces (24). A first region (16) of the LOE contains a first set of partially-reflecting surfaces (17) oriented to redirect image illumination propagating within the LOE towards a second region of the LOE (18), which contains a second set of partially-reflecting surfaces (19) oriented to couple out the image illumination towards the user. The first set of partially-reflecting surfaces (17) extend across at least 95 percent of a thickness of the LOE, while the second set of partially-reflecting surfaces (19) are contained within a subsection of the thickness spanning less than 95 percent of the thickness, so that the second set of partially-reflecting surfaces (19) are excluded from one or both surface layers of the second region (18).

7 Claims, 11 Drawing Sheets

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,829,197 A | 8/1974 | Thelen |
| 3,857,109 A | 12/1974 | Pilloff |
| 3,873,209 A | 3/1975 | Schinke et al. |
| 3,940,204 A | 2/1976 | Withrington |
| 4,084,883 A | 4/1978 | Eastman et al. |
| 4,191,446 A | 3/1980 | Arditty et al. |
| 4,309,070 A | 1/1982 | St. Leger Searle |
| 4,331,387 A | 5/1982 | Wentz |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,720,189 A | 1/1988 | Heynen et al. |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,208,800 A | 5/1993 | Isobe et al. |
| 5,231,642 A | 7/1993 | Scifres et al. |
| 5,235,589 A | 8/1993 | Yokomori et al. |
| 5,301,067 A | 4/1994 | Bleier et al. |
| 5,341,230 A | 8/1994 | Smith |
| 5,353,134 A | 10/1994 | Michel et al. |
| 5,367,399 A | 11/1994 | Kramer |
| 5,369,415 A | 11/1994 | Richard et al. |
| 5,430,505 A | 7/1995 | Katz |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Meinrad |
| 5,708,449 A | 1/1998 | Heacock et al. |
| 5,712,694 A | 1/1998 | Taira et al. |
| 5,724,163 A | 3/1998 | David |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,930,046 A | 7/1999 | Solberg et al. |
| 5,966,223 A | 10/1999 | Amitai et al. |
| 5,982,536 A | 11/1999 | Swan |
| 6,021,239 A | 2/2000 | Minami et al. |
| 6,023,372 A | 2/2000 | Spitzer et al. |
| 6,052,500 A | 4/2000 | Takano et al. |
| 6,091,548 A | 7/2000 | Chen |
| 6,144,347 A | 11/2000 | Mizoguchi et al. |
| 6,154,321 A | 11/2000 | Melville |
| 6,222,676 B1 | 4/2001 | Togino et al. |
| 6,222,677 B1 | 4/2001 | Budd et al. |
| 6,239,092 B1 | 5/2001 | Papasso et al. |
| 6,264,328 B1 | 7/2001 | Williams |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,490,104 B1 | 12/2002 | Gleckman et al. |
| 6,509,982 B2 | 1/2003 | Steiner |
| 6,519,400 B2 | 2/2003 | Biscardi et al. |
| 6,542,307 B2 | 4/2003 | Gleckman et al. |
| 6,556,282 B2 | 4/2003 | Jamieson et al. |
| 6,577,411 B1 | 6/2003 | David |
| 6,580,529 B1 | 6/2003 | Amitai et al. |
| 6,671,100 B1 | 12/2003 | McRuer |
| 6,690,513 B2 | 2/2004 | Hulse et al. |
| 6,710,902 B2 | 3/2004 | Takeyama |
| 6,762,801 B2 | 7/2004 | Weiss et al. |
| 6,775,432 B2 | 8/2004 | Basu |
| 6,791,760 B2 | 9/2004 | Janeczko et al. |
| 6,798,579 B2 | 9/2004 | Robinson et al. |
| 6,799,859 B1 | 10/2004 | Kozo |
| 6,805,490 B2 | 10/2004 | Levola |
| 6,829,095 B2 | 12/2004 | Amitai |
| 6,847,488 B2 | 1/2005 | Travis |
| 6,880,931 B2 | 4/2005 | Moliton et al. |
| 6,927,694 B1 | 9/2005 | Smith et al. |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,355,795 B1 | 4/2008 | Yamazaki et al. |
| 7,391,573 B2 | 6/2008 | Amitai |
| 7,418,170 B2 | 8/2008 | Mukawa et al. |
| 7,430,355 B2 | 9/2008 | Heikenfeld et al. |
| 7,448,170 B2 | 11/2008 | Milovan et al. |
| 7,570,859 B1 | 8/2009 | DeJong |
| 7,589,901 B2 | 9/2009 | DeJong et al. |
| 7,613,373 B1 | 11/2009 | DeJong |
| 7,653,268 B1 | 1/2010 | DeJong |
| 7,724,443 B2 | 5/2010 | Amitai |
| 7,778,508 B2 | 8/2010 | Hirayama |
| 7,839,575 B2 | 11/2010 | DeJong et al. |
| 7,949,214 B2 | 5/2011 | DeJong |
| 7,995,275 B2 | 8/2011 | Maeda et al. |
| 8,035,872 B2 | 10/2011 | Ouchi |
| 8,187,481 B1 | 5/2012 | Hobbs |
| 8,369,019 B2 | 2/2013 | Baker et al. |
| 8,391,668 B2 | 3/2013 | Dejong |
| 8,432,614 B2 | 4/2013 | Amitai |
| 8,472,119 B1 | 6/2013 | Kelly |
| 8,531,773 B2 | 9/2013 | DeJong |
| 8,548,290 B2 | 10/2013 | Travers |
| 8,649,099 B2 | 2/2014 | Schultz et al. |
| 8,655,178 B2 | 2/2014 | Capron et al. |
| 8,665,178 B1 | 3/2014 | Wang |
| 8,666,208 B1 | 3/2014 | Amirparviz et al. |
| 8,736,963 B2 | 5/2014 | Robbins et al. |
| 8,743,464 B1 | 6/2014 | Amirparviz |
| 8,848,289 B2 | 9/2014 | AMirparviz et al. |
| 8,913,865 B1 | 12/2014 | Bennett |
| 9,541,762 B2 | 1/2017 | Mukawa et al. |
| 9,551,880 B2 | 1/2017 | Amitai |
| 9,791,703 B1 | 10/2017 | Vallius |
| 9,798,061 B2 | 10/2017 | Hsiao et al. |
| 9,805,633 B2 | 10/2017 | Zheng |
| 10,133,070 B2 | 11/2018 | Danziger |
| 10,222,535 B2 | 3/2019 | Remhof et al. |
| 10,302,957 B2 | 5/2019 | Sissom |
| 10,317,679 B2 | 6/2019 | Ayres et al. |
| 10,330,938 B2 | 6/2019 | Cheng et al. |
| 10,437,068 B2 | 10/2019 | Weng et al. |
| 10,444,481 B2 | 10/2019 | Takahashi |
| 10,558,044 B2 | 2/2020 | Pan |
| 10,571,699 B1 | 2/2020 | Parsons et al. |
| 10,678,055 B2 | 6/2020 | Edwin et al. |
| 10,725,291 B2 | 7/2020 | Chi et al. |
| 10,732,461 B2 | 8/2020 | Yoshida |
| 10,962,787 B1 | 3/2021 | Lou |
| 11,009,704 B2 | 5/2021 | Ayres et al. |
| 11,054,581 B2 | 7/2021 | Ayres et al. |
| 11,061,335 B2 | 7/2021 | Koga et al. |
| 11,187,902 B2 | 11/2021 | Urness et al. |
| 11,262,564 B2 | 3/2022 | Tanaka |
| 11,378,391 B2 | 7/2022 | Do et al. |

(56) References Cited

U.S. PATENT DOCUMENTS

| | | |
|---|---|---|
| 11,531,201 B2 | 12/2022 | Amitai |
| 11,561,335 B2 | 1/2023 | Danziger et al. |
| 2001/0000124 A1 | 4/2001 | Kollin et al. |
| 2002/0015233 A1 | 2/2002 | Park |
| 2002/0080487 A1 | 6/2002 | Yajima |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0090439 A1 | 5/2003 | Spitzer et al. |
| 2003/0165017 A1 | 9/2003 | Amitai et al. |
| 2003/0197938 A1 | 10/2003 | Schmidt et al. |
| 2003/0218718 A1 | 11/2003 | Moliton et al. |
| 2004/0085649 A1 | 5/2004 | Repetto et al. |
| 2004/0137189 A1 | 7/2004 | Tellini et al. |
| 2005/0018308 A1 | 1/2005 | Cassarly et al. |
| 2005/0024849 A1 | 2/2005 | Parker et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0265044 A1 | 12/2005 | Chen et al. |
| 2006/0126182 A1 | 6/2006 | Levola |
| 2006/0132914 A1 | 6/2006 | Weiss et al. |
| 2006/0221448 A1 | 10/2006 | Nivon et al. |
| 2006/0268421 A1 | 11/2006 | Shimizu et al. |
| 2007/0035707 A1 | 2/2007 | Margulis |
| 2007/0007085 A1 | 3/2007 | Hirayama |
| 2007/0070859 A1 | 3/2007 | Hirayama |
| 2007/0015967 A1 | 7/2007 | Freeman et al. |
| 2007/0165192 A1 | 7/2007 | Prior |
| 2008/0094586 A1 | 4/2008 | Hirayama |
| 2008/0151375 A1 | 6/2008 | Lin |
| 2008/0151379 A1* | 6/2008 | Amitai ............... G02B 27/0176 359/629 |
| 2009/0003406 A1 | 1/2009 | Sjogren et al. |
| 2009/0034069 A1 | 2/2009 | Pre |
| 2009/0059380 A1 | 3/2009 | Moliton et al. |
| 2009/0190222 A1 | 7/2009 | Simmonds et al. |
| 2010/0027289 A1 | 2/2010 | Aiki et al. |
| 2010/0053148 A1 | 3/2010 | Khazeni et al. |
| 2010/0201953 A1 | 8/2010 | Freeman |
| 2010/0202128 A1 | 8/2010 | Saccomanno |
| 2010/0214635 A1 | 8/2010 | Sasaki et al. |
| 2010/0220295 A1 | 9/2010 | Mukawa et al. |
| 2010/0278480 A1 | 11/2010 | Vasylyev |
| 2010/0291489 A1 | 11/2010 | Moskovits et al. |
| 2011/0096566 A1 | 4/2011 | Tsai et al. |
| 2011/0109880 A1 | 5/2011 | Nummela |
| 2011/0176218 A1 | 7/2011 | Noui |
| 2011/0210202 A1 | 9/2011 | Schroder et al. |
| 2012/0039576 A1 | 2/2012 | Dangel et al. |
| 2012/0044572 A1 | 2/2012 | Simmonds et al. |
| 2012/0147361 A1 | 6/2012 | Mochizuki et al. |
| 2012/0206811 A1 | 8/2012 | Mukawa et al. |
| 2013/0135749 A1 | 5/2013 | Akutsu et al. |
| 2013/0150430 A1 | 6/2013 | Croce et al. |
| 2013/0163089 A1 | 6/2013 | Bohn |
| 2013/0208362 A1 | 8/2013 | Bohn et al. |
| 2013/0025043 A1 | 9/2013 | Robbins et al. |
| 2013/0150431 A1 | 9/2013 | Robbins et al. |
| 2013/0242392 A1 | 9/2013 | Amirparviz et al. |
| 2013/0250430 A1 | 9/2013 | Robbuns et al. |
| 2013/0250431 A1 | 9/2013 | Robbins et al. |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0019801 A1 | 7/2014 | Lamb et al. |
| 2014/0185142 A1 | 7/2014 | Gupta et al. |
| 2014/0192418 A1 | 7/2014 | Suzuki |
| 2014/0226215 A1 | 8/2014 | Komatsu et al. |
| 2015/0016777 A1 | 1/2015 | Abovitz et al. |
| 2015/0081313 A1 | 3/2015 | Boross et al. |
| 2015/0138646 A1 | 5/2015 | Tatsugi |
| 2015/0160529 A1 | 6/2015 | Popovich et al. |
| 2015/0182348 A1 | 7/2015 | Siegal et al. |
| 2015/0219834 A1 | 8/2015 | Nichol et al. |
| 2015/0289762 A1 | 10/2015 | Popovich et al. |
| 2015/0338655 A1 | 11/2015 | Sawada et al. |
| 2016/0234485 A1 | 8/2016 | Robbins et al. |
| 2016/0031456 A1 | 10/2016 | Jones et al. |
| 2016/0313567 A1 | 10/2016 | Kurashige |
| 2016/0370589 A1 | 12/2016 | Wang |
| 2017/0003504 A1 | 1/2017 | Vallius |
| 2017/0023761 A1 | 1/2017 | Dural et al. |
| 2017/0045743 A1 | 2/2017 | Dobschal et al. |
| 2017/0122725 A1 | 5/2017 | Yeoh |
| 2017/0242249 A1 | 8/2017 | Wall |
| 2017/0255012 A1 | 9/2017 | Tam |
| 2017/0276947 A1 | 9/2017 | Yokoyama |
| 2017/0285346 A1 | 10/2017 | Pan |
| 2017/0343822 A1 | 11/2017 | Border et al. |
| 2017/0353714 A1 | 12/2017 | Poulad et al. |
| 2017/0371160 A1 | 12/2017 | Schultz |
| 2018/0101087 A1 | 4/2018 | Shiohara |
| 2018/0210202 A1* | 7/2018 | Danziger ........... G02B 27/0101 |
| 2018/0246335 A1 | 8/2018 | Cheng et al. |
| 2018/0267309 A1 | 9/2018 | Klug |
| 2018/0275409 A1 | 9/2018 | Gao et al. |
| 2018/0284443 A1 | 10/2018 | Matsuki et al. |
| 2018/0284448 A1 | 10/2018 | Matsuki |
| 2019/0086674 A1 | 3/2019 | Sinay et al. |
| 2019/0137818 A1 | 5/2019 | SAito |
| 2019/0212487 A1 | 7/2019 | Danziger et al. |
| 2019/0227215 A1 | 7/2019 | Danziger et al. |
| 2019/0293838 A1 | 9/2019 | Haba |
| 2020/0066215 A1 | 2/2020 | Koo et al. |
| 2020/0192089 A1 | 6/2020 | Haddick et al. |
| 2020/0225476 A1 | 7/2020 | Urness et al. |
| 2020/0284967 A1 | 9/2020 | Schowengerdt et al. |
| 2020/0034127 A1 | 10/2020 | Ayres et al. |
| 2021/0033774 A1 | 2/2021 | Tanaka |
| 2021/0101245 A1 | 4/2021 | Han et al. |
| 2022/0004007 A1 | 1/2022 | Bhakta et al. |
| 2022/0099885 A1 | 3/2022 | Ronen et al. |
| 2022/0357498 A1 | 11/2022 | Fuchs et al. |

FOREIGN PATENT DOCUMENTS

| | | |
|---|---|---|
| CN | 205787362 U | 12/2016 |
| CN | 107238928 | 10/2017 |
| CN | 109613644 | 4/2019 |
| DE | 1422172 | 11/1970 |
| DE | 19725262 | 12/1998 |
| DE | 102013106392 | 12/2014 |
| EP | 0380035 | 8/1990 |
| EP | 0399865 | 11/1990 |
| EP | 0543718 | 5/1993 |
| EP | 0566004 | 10/1993 |
| EP | 1180711 | 2/2002 |
| EP | 1326102 | 7/2003 |
| EP | 1385023 | 1/2004 |
| EP | 0770818 | 4/2007 |
| EP | 2530510 | 12/2012 |
| FR | 2496905 | 6/1982 |
| FR | 2638242 | 4/1990 |
| FR | 2721872 | 1/1996 |
| GB | 1514977 | 6/1978 |
| GB | 2220081 | 12/1989 |
| GB | 2272980 | 6/1994 |
| GB | 2278222 | 11/1994 |
| GB | 2278888 | 12/1994 |
| JP | H02182447 A | 7/1990 |
| JP | H08-070782 | 3/1996 |
| JP | 1996313843 | 11/1996 |
| JP | 2002539498 | 11/2002 |
| JP | 2003140081 | 5/2003 |
| JP | 4394919 | 5/2004 |
| JP | 2004527801 | 9/2004 |
| JP | 2005084522 | 3/2005 |
| JP | 2010044172 | 2/2010 |
| JP | 2012-037761 U | 2/2012 |

(56) References Cited

FOREIGN PATENT DOCUMENTS

| | | |
|---|---|---|
| JP | 2012123936 | 6/2012 |
| JP | 2012058404 | 4/2014 |
| JP | 2015121647 | 7/2015 |
| JP | 2016028275 | 2/2016 |
| JP | 2016033867 | 3/2016 |
| WO | 0004407 | 1/2000 |
| WO | 0063738 | 10/2000 |
| WO | 0195025 | 12/2001 |
| WO | 2005093493 | 10/2005 |
| WO | 2006098097 | 9/2006 |
| WO | 2006098809 | 9/2006 |
| WO | 2007054928 | 5/2007 |
| WO | 2009074638 | 6/2009 |
| WO | 2011130720 | 10/2011 |
| WO | 2013065656 | 5/2013 |
| WO | 2015081313 | 6/2015 |
| WO | WO2015012280 | 3/2017 |
| WO | 2017106873 | 6/2017 |
| WO | 2018/013307 | 1/2018 |
| WO | 2018200913 | 11/2018 |
| WO | 2019195193 | 10/2019 |
| WO | 2021220267 | 11/2021 |
| WO | 2021229563 | 11/2021 |

OTHER PUBLICATIONS

R.. J_ Weiblen el al: "Optimized moth-eye anti-reflective structures for as_2S_3 chalcogenlide optical fibers", Optics 5 Express vol. 24, Issue 10, pp. 10172-10187 (2016) •https://doi.org/10.1364/OE.24.010172.

S.Chattopadhyay el al: "Anti-reflecting and pholonic nanostructures", Materials Science and Engineering: R: Repots, ol. 69, No. 1-3, Jun. 20, 2010, pp. 1-35.

Petros Stavroulakis et al: Suppression of backscattered diffraction from sub-wavelenght "moth-eyearrays References and Links/ Optics Express 1", Endeavour Nanotechnology Zoolog_ Sci_ Philos_ Trans_ J_ Mod_ Opt Appl ppt. Opt. Acta {Lond.) Appl. Opt. Appl. Opt. Opt. Lett. Jpn.☐Appl. Pjys. J. Ceram. Soc. Jpn. Opt. Commun. App;. Opt ppt. Lett. Nanotechno, Jan. 1, 1967, pp. 79-84.

Chin-Ho Chang el al: "Nanoslrulured gradient-index anlireflection diffractive optics", Optics Letters, vol. 36, No. 12, Jun. 5, 2011, p. 2354.

Piaoyin Yang et al: "Antireflection effects at nanostructured material interfaces and the suppression of thin-film nterference", Nanotechnology, vol. 24, No. 23, May 15, 2013, p. 235202.

R.. J_ Weiblen el al: "Optimized moth-eye anti-reflective structures for as_2S_3 chalcogenlide optical fibers", Optics Express vol. 24, Issue 10, p. 10172-10187 (2016) •https://doi.org/10.1364/OE.24.010172.

* cited by examiner

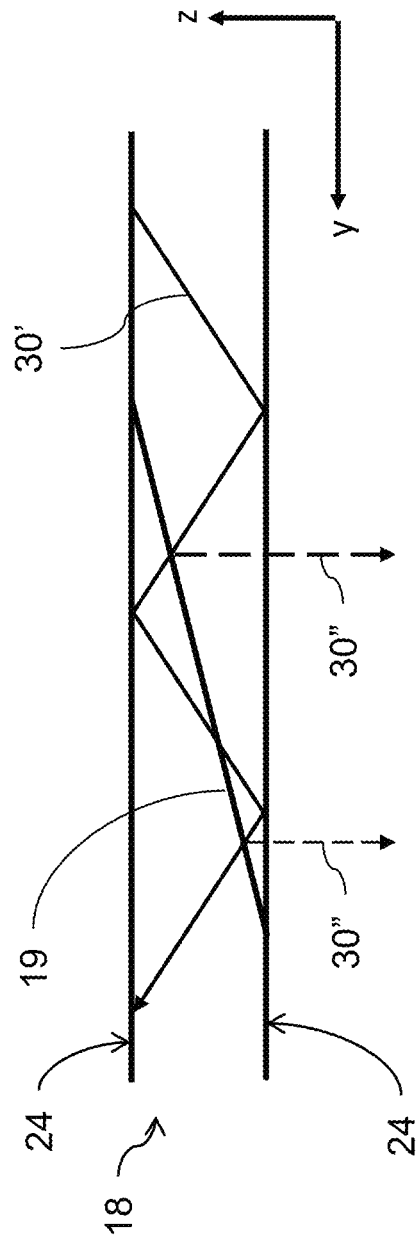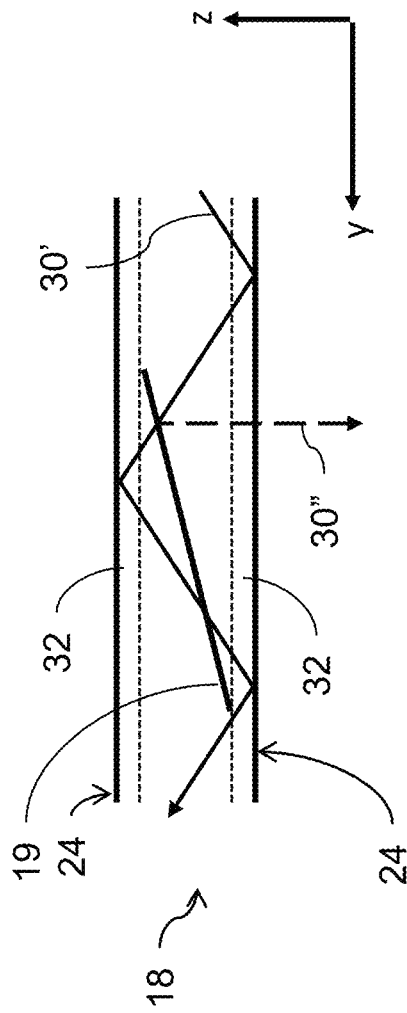
FIG. 4A
FIG. 4B

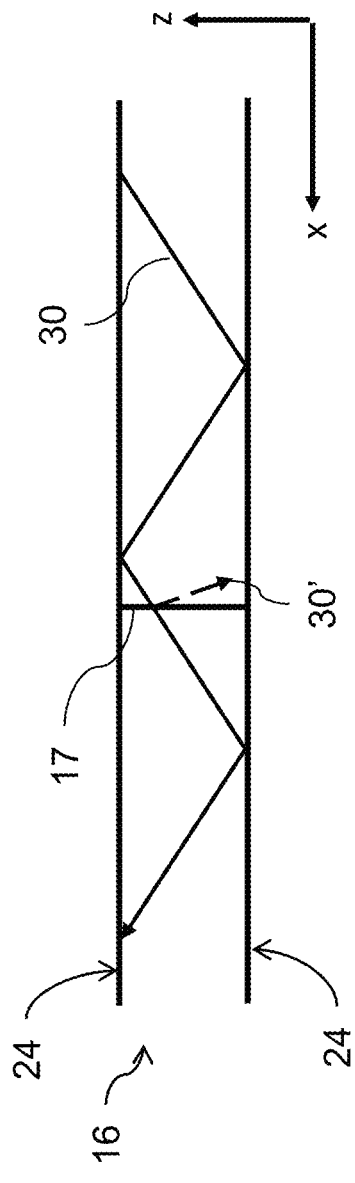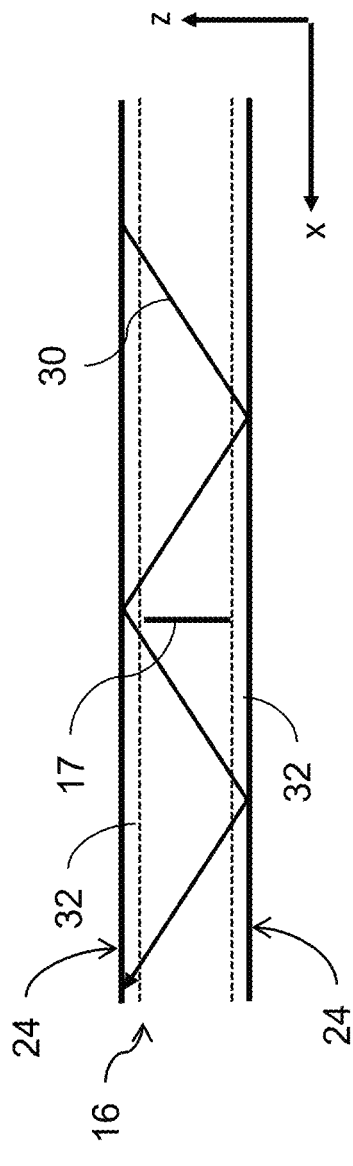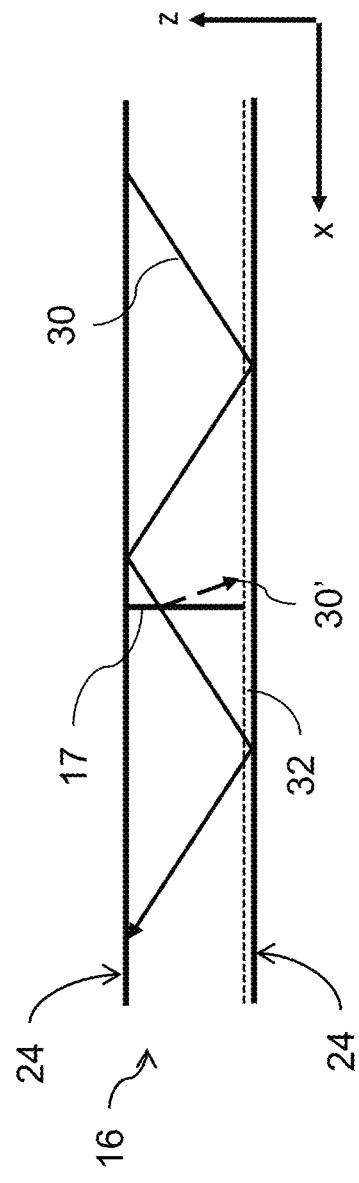

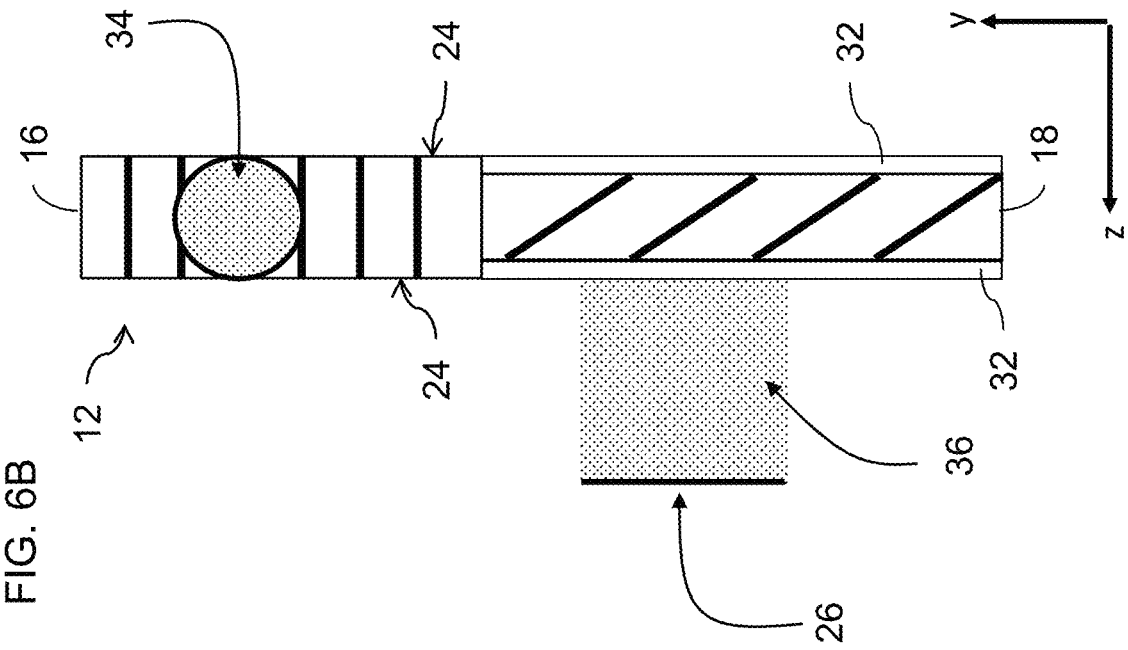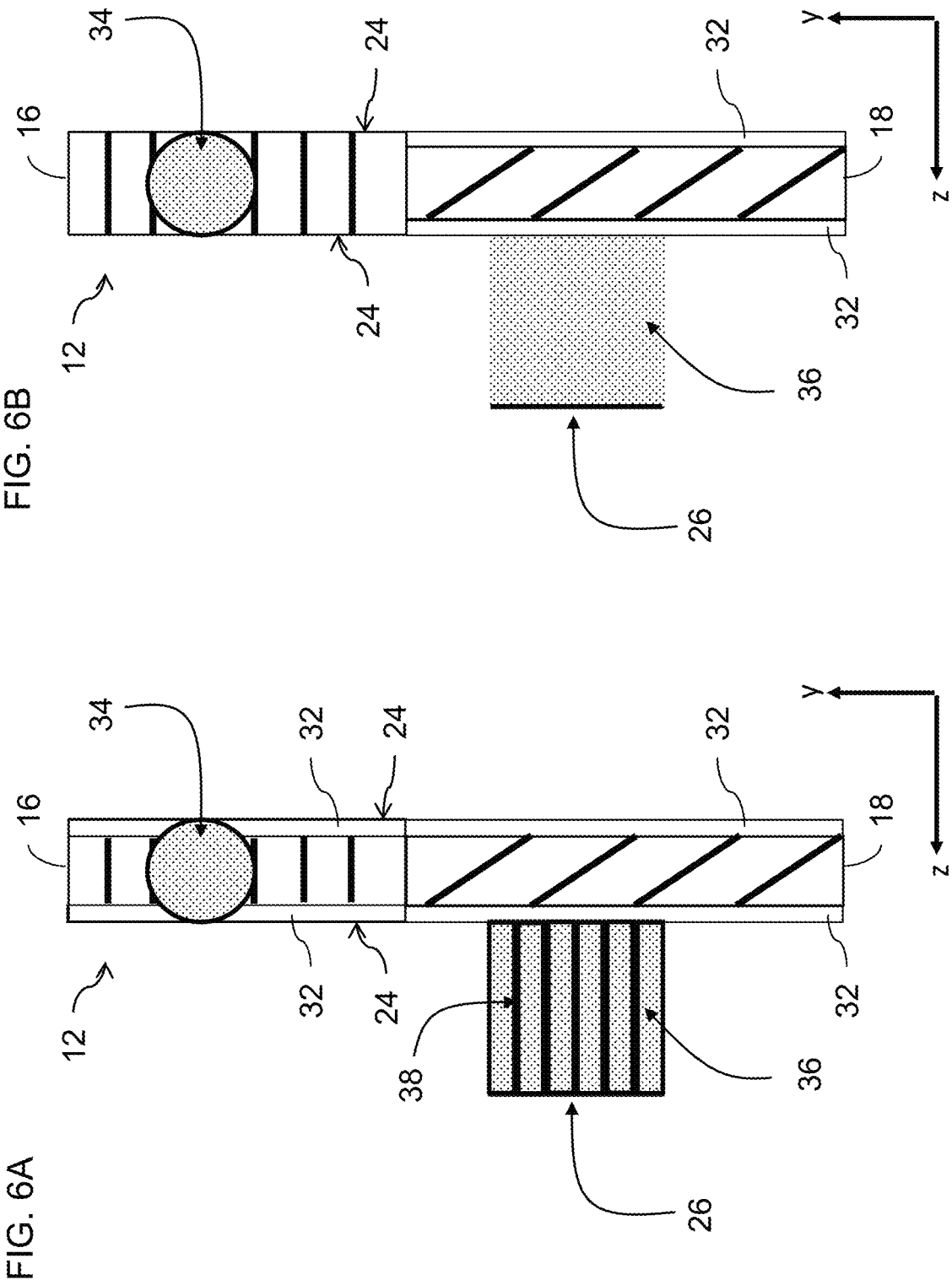

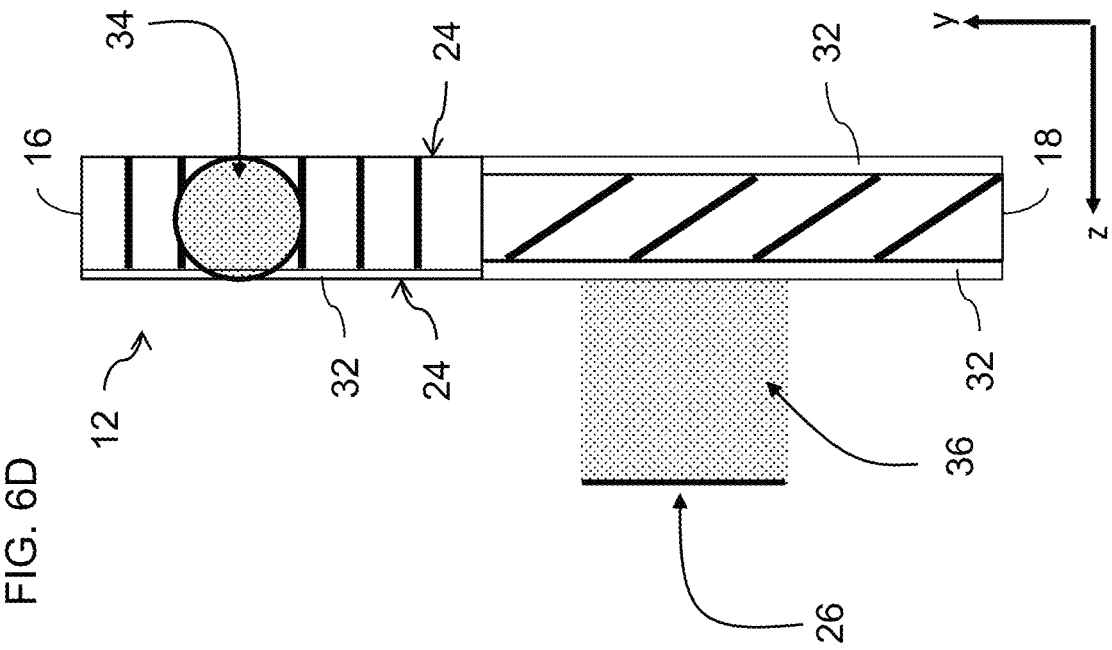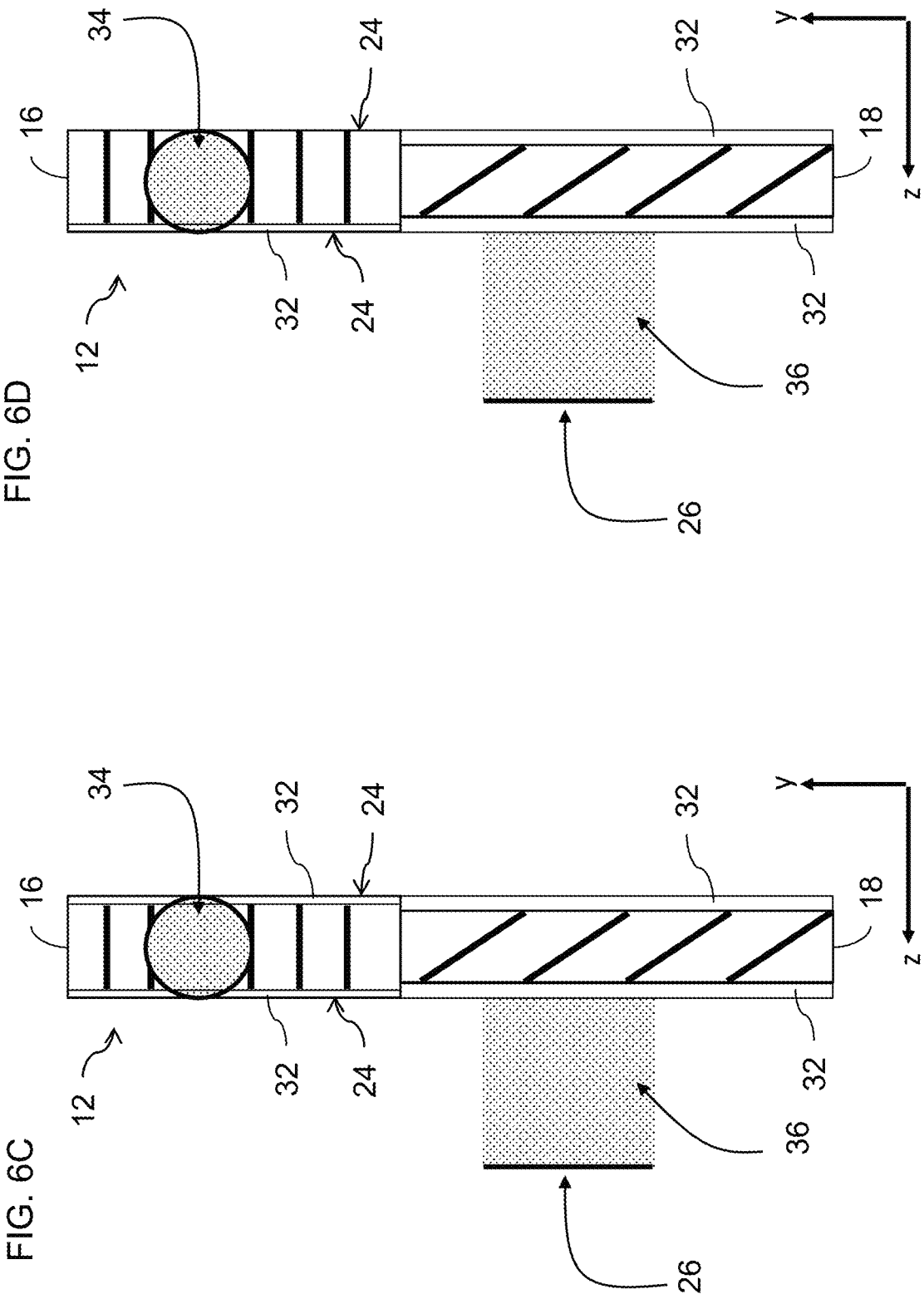

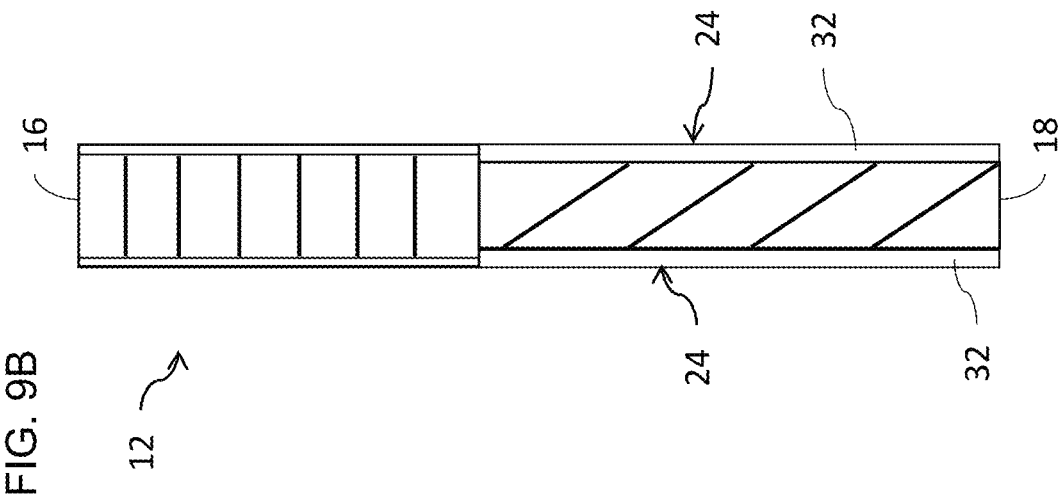
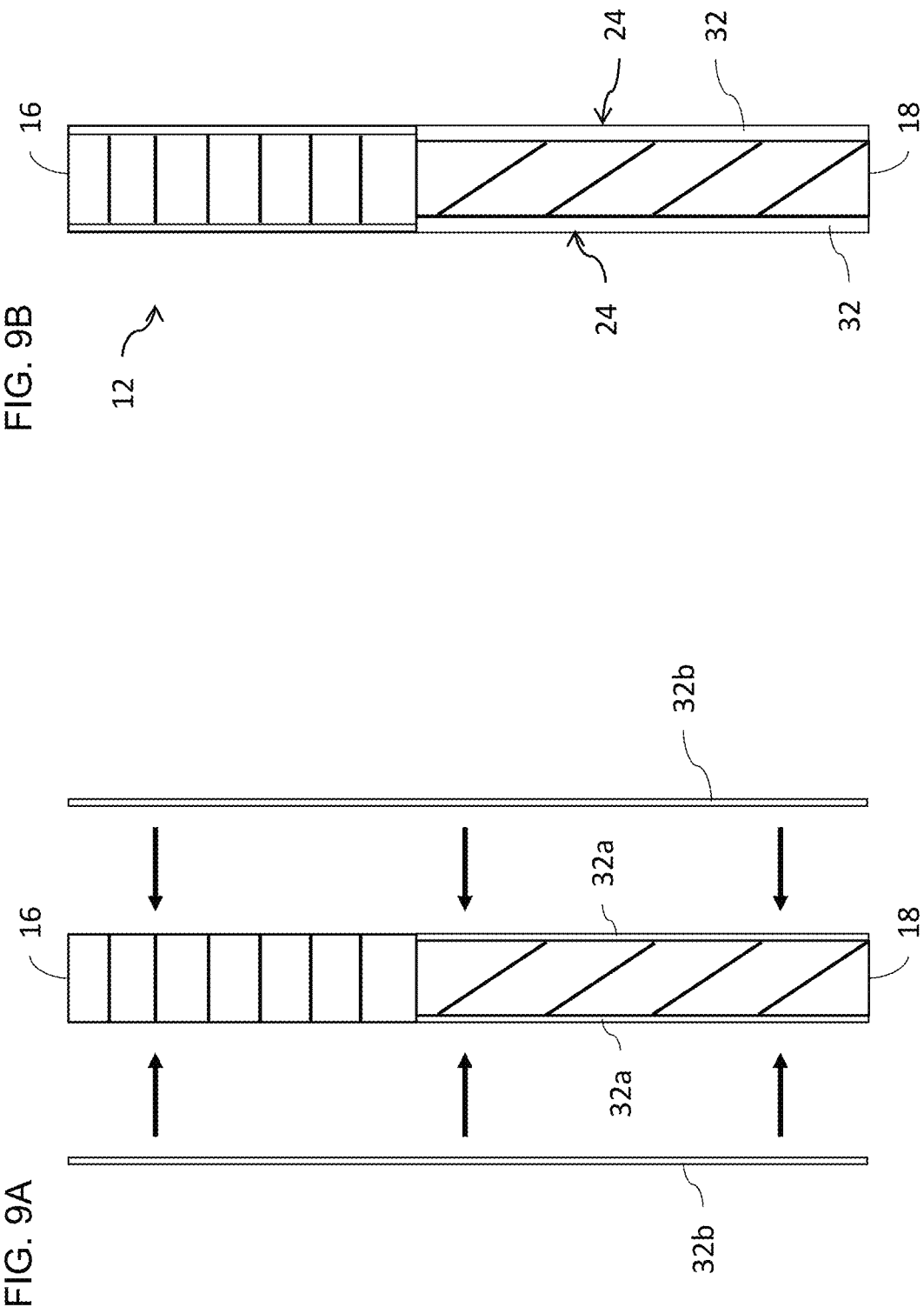

COMPOUND LIGHT-GUIDE OPTICAL ELEMENTS

FIELD OF THE INVENTION

The present invention relates to optical systems and, in particular, it concerns an optical system including a light-guide optical element (LOE) for achieving optical aperture expansion.

BACKGROUND OF THE INVENTION

Compound Light-Guide Optical Elements (LOEs) or "two-dimensional expansion waveguides" have been described in previous publications by Lumus Ltd. (Israel). Examples of such compound LOEs may be found, for example, in PCT publication no. WO 2020/049542. In general terms, these compound LOEs employ two regions, each of which is a parallel-faced block of transparent material for supporting propagation of light carrying a collimated image by internal reflection at major surfaces, and includes a set of mutually-parallel, internal, partially-reflecting surfaces or "facets", which progressively redirect part of the collimated image and achieve expansion of the optical aperture. By combining two such elements with different facet orientations, it is possible to achieve two-dimensional expansion of an optical aperture within a single element, thereby expanding an input image from an image projector and outputting it over a larger area towards the eye of an observer.

For convenience of reference, the light-guide optical element (LOE) region responsible for a first stage of expansion within the compound element is referred to as the "first LOE" or "LOE1", while the LOE region responsible for coupling out of the once-deflected image towards the observer is referred to herein as the "second LOE" or "LOE2".

SUMMARY OF THE INVENTION

The present invention is an optical system for directing image illumination injected at a coupling-in region towards a user for viewing.

According to the teachings of an embodiment of the present invention there is provided, an optical system for directing image illumination injected at a coupling-in region towards a user for viewing, the optical system comprising a light-guide optical element (LOE) formed from transparent material, the LOE comprising: (a) a first region containing a first set of planar, mutually-parallel, partially-reflecting surfaces having a first orientation; (b) a second region containing a second set of planar, mutually-parallel, partially-reflecting surfaces having a second orientation non-parallel to the first orientation; and (c) a set of mutually-parallel major external surfaces, the major external surfaces extending across the first and second regions such that both the first set of partially-reflecting surfaces and the second set of partially-reflecting surfaces are located between the major external surfaces, wherein the second set of partially-reflecting surfaces are at an oblique angle to the major external surfaces so that a part of image illumination propagating within the LOE by internal reflection at the major external surfaces from the first region into the second region is coupled out of the LOE towards the user, and wherein the first set of partially-reflecting surfaces are oriented so that a part of image illumination propagating within the LOE by internal reflection at the major external surfaces from the coupling-in region is deflected towards the second region, wherein the LOE has a thickness between the major external surfaces, and wherein the first set of partially-reflecting surfaces extend across at least 95 percent of the thickness, and the second set of partially-reflecting surfaces in the second region are contained within a subsection of the thickness spanning less than 95 percent of the thickness so that the second set of partially-reflecting surfaces are excluded from at least one surface layer of the second region.

According to a further feature of an embodiment of the present invention, the second set of partially-reflecting surfaces are excluded from surface layers of both of the major external surfaces in the second region.

According to a further feature of an embodiment of the present invention, a total thickness of the at least one surface layer of the second region from which the second set of partially-reflecting surfaces are excluded is between 6 percent and 33 percent of the thickness.

According to a further feature of an embodiment of the present invention, a spacing between adjacent surfaces of the second set of partially-reflecting surfaces in a direction parallel to the major external surfaces is at least 1 mm, and wherein a total thickness of the at least one surface layer of the second region from which the second set of partially-reflecting surfaces are excluded is at least 10 percent of the thickness.

According to a further feature of an embodiment of the present invention, the first set of partially-reflecting surfaces extend across at least 96 percent of the thickness.

According to a further feature of an embodiment of the present invention, the first set of partially-reflecting surfaces extend across at least 98 percent of the thickness.

According to a further feature of an embodiment of the present invention, the first set of partially-reflecting surfaces extend across an entirety of the thickness.

According to a further feature of an embodiment of the present invention, the first orientation of the first set of partially-reflecting surfaces is orthogonal to the major external surfaces.

BRIEF DESCRIPTION OF THE DRAWINGS

The invention is herein described, by way of example only, with reference to the accompanying drawings, wherein:

FIGS. 4A and 4B are partial schematic cross-sectional views taken along the line IV-IV in FIG. 3, showing ray paths for a ray propagating within a second region of the LOE and encountering an internal partially-reflecting surface which does, or does not, span the thickness of the LOE, respectively;

FIGS. 5A, 5B and 5C are partial schematic cross-sectional views taken along the line V-V in FIG. 3, showing ray paths for a ray propagating within a first region of the LOE and encountering an internal partially-reflecting surface which fully spans the thickness of the LOE, or is spaced from both major surfaces, or from just one major surface, respectively;

FIG. 6A is a schematic side views of the LOE of FIGS. 2A and 2B in an implementation in which both the first and second regions of the LOE have surface layers from which the partially-reflecting internal surfaces are excluded, i.e., cover plates;

FIG. 6B is a view similar to FIG. 6A in an implementation in which only the second region of the LOE has cover plates;

FIG. 6C is a view similar to FIG. 6A in which the second region of the LOE has cover plates, and the first region of the LOE has cover plates thinner than those of the second region;

FIG. 6D is a view similar to FIG. 6C in which only one side of the first region of the LOE is provided with a cover plate;

FIG. 9A is a schematic side view illustrating a stage of a production process in which a thin cover plate is applied across the entirety of an LOE in which the first region was initially formed without a cover plate and the second region was formed with a cover plate having only part of the desired cover plate thickness; and FIG. 9B is a schematic side view illustrating the structure resulting from the production process of FIG. 9A.

DESCRIPTION OF THE PREFERRED EMBODIMENTS

The present invention is an optical system for directing image illumination injected at a coupling-in region towards a user for viewing.

Certain embodiments of the present invention provide an optical system including a light-guide optical element (LOE) for achieving optical aperture expansion for the purpose of a head-up display, and most preferably a near-eye display, which may be a virtual reality display, or more preferably an augmented reality display.

Figure 1A:
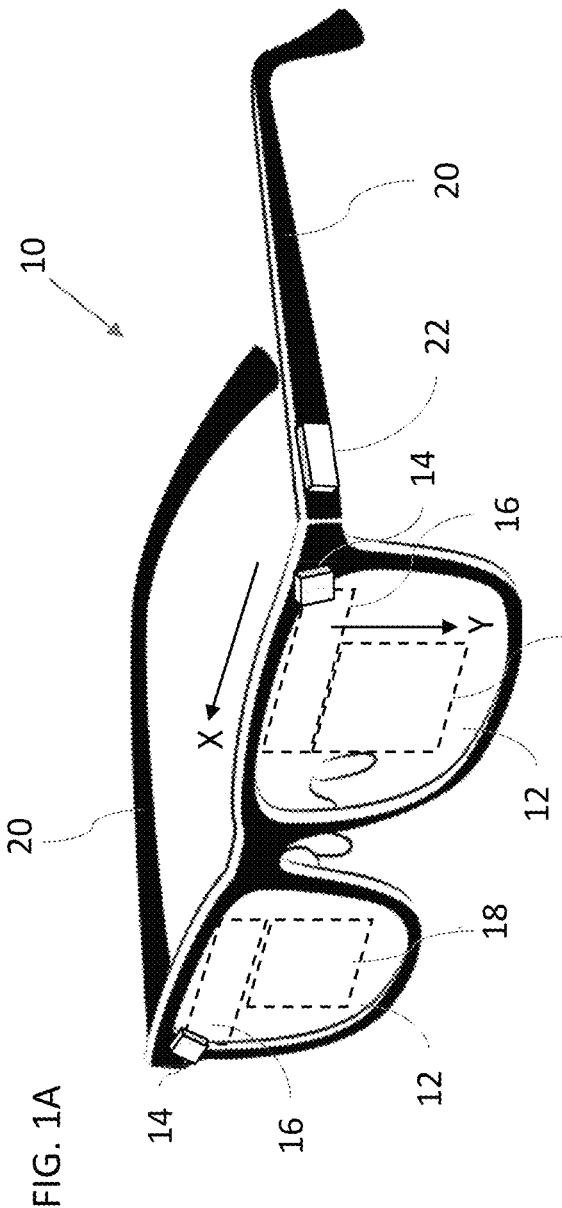
FIGS. 1A and 1B are schematic isometric views of an optical system implemented using a light-guide optical element (LOE), constructed and operative according to the teachings of the present invention, illustrating a top-down and a side-injection configuration, respectively.
Figure 1B:
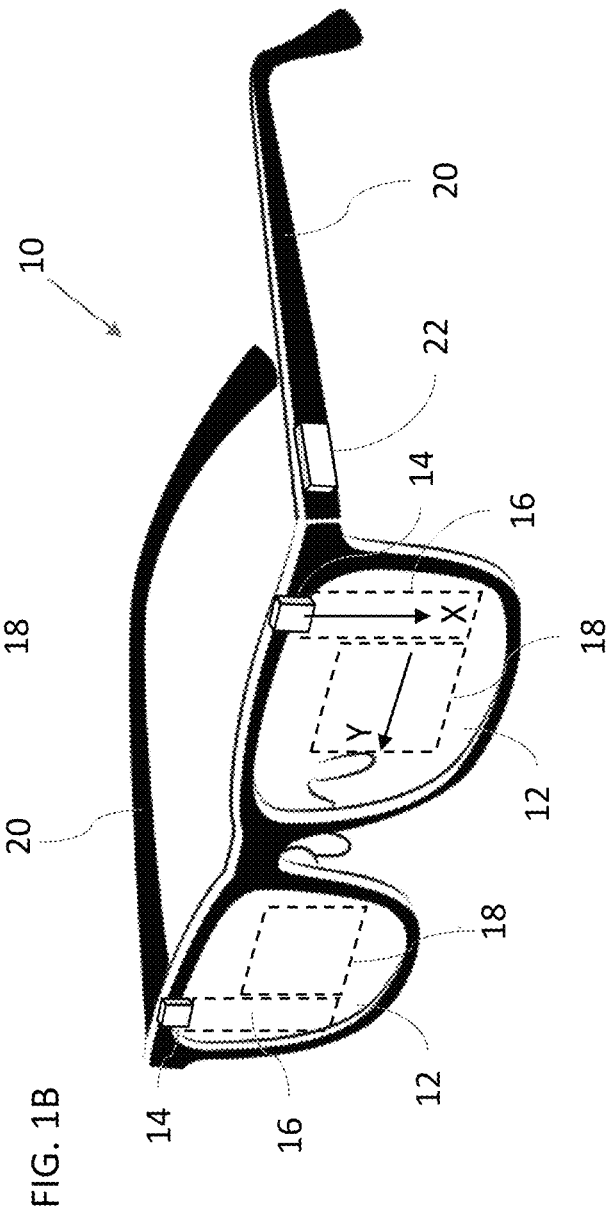

An exemplary implementation of a device in the form of a near-eye display, generally designated 10, employing an LOE 12 according to the teachings of an embodiment of the present invention, is illustrated schematically in FIGS. 1A and 1B. The near-eye display 10 employs a compact image projector (or "POD") 14 optically coupled so as to inject an image into LOE (interchangeably referred to as a "waveguide," a "substrate" or a "slab") 12 within which the image light is trapped in one dimension by internal reflection at a set of mutually-parallel planar external surfaces. The light impinges of a set of partially-reflecting surfaces (interchangeably referred to as "facets") that are parallel to each other, and inclined obliquely to the direction of propagation of the image light, with each successive facet deflecting a proportion of the image light into a deflected direction, also trapped/guided by internal reflection within the substrate. This first set of facets are not illustrated individually in FIGS. 1A and 1B, but are located in a first region of the LOE designated 16. This partial reflection at successive facets achieves a first dimension of optical aperture expansion.

In a first set of preferred but non-limiting examples of the present invention, the aforementioned set of facets are orthogonal to the major external surfaces of the substrate. In this case, both the injected image and its conjugate undergoing internal reflection as it propagates within region 16 are deflected and become conjugate images propagating in a deflected direction. In an alternative set of preferred but non-limiting examples, the first set of partially-reflecting surfaces are obliquely angled relative to the major external surfaces of the LOE. In the latter case, either the injected image or its conjugate forms the desired deflected image propagating within the LOE, while the other reflection may be minimized, for example, by employing angularly-selective coatings on the facets which render them relatively transparent to the range of incident angles presented by the image whose reflection is not needed.

The first set of partially-reflecting surfaces deflect the image illumination from a first direction of propagation trapped by total internal reflection (TIR) within the substrate to a second direction of propagation, also trapped by TIR within the substrate.

The deflected image illumination then passes into a second substrate region 18, which may be implemented as an adjacent distinct substrate or as a continuation of a single substrate, in which a coupling-out arrangement (typically a further set of partially reflective facets) progressively couples out a proportion of the image illumination towards the eye of an observer located within a region defined as the eye-motion box (EMB), thereby achieving a second dimension of optical aperture expansion. The overall device may be implemented separately for each eye, and is preferably supported relative to the head of a user with the each LOE 12 facing a corresponding eye of the user. In one particularly preferred option as illustrated here, a support arrangement is implemented as an eye glasses frame with sides 20 for supporting the device relative to ears of the user. Other forms of support arrangement may also be used, including but not limited to, head bands, visors or devices suspended from helmets.

Reference is made herein in the drawings and claims to an X axis which extends horizontally (FIG. 1A) or vertically (FIG. 1B), in the general extensional direction of the first region of the LOE, and a Y axis which extends perpendicular thereto, i.e., vertically in FIG. 1A and horizontally in FIG. 1B.

In very approximate terms, the first LOE, or first region 16 of LOE 12, may be considered to achieve aperture expansion in the X direction while the second LOE, or second region 18 of LOE 12, achieves aperture expansion in the Y direction. The details of the spread of angular directions in which different parts of the field of view propagate will be addressed more precisely below. It should be noted that the orientation as illustrated in FIG. 1A may be regarded as a "top-down" implementation, where the image illumination entering the main (second region) of the LOE enters from the top edge, whereas the orientation illustrated in FIG. 1B may be regarded as a "side-injection" implementation, where the axis referred to here as the Y axis is deployed horizontally. In the remaining drawings, the various features of certain embodiments of the present invention will be illustrated in the context of a "top-down" orientation, similar to FIG. 1A. However, it should be appreciated that all of those features are equally applicable to side-injection implementations, which also fall within the scope of the invention. In certain cases, other intermediate orientations are also applicable, and are included within the scope of the present invention except where explicitly excluded.

The POD employed with the devices of the present invention is preferably configured to generate a collimated image, i.e., in which the light of each image pixel is a parallel beam, collimated to infinity, with an angular direction corresponding to the pixel position. The image illumination thus spans a range of angles corresponding to an angular field of view in two dimensions.

Image projector 14 includes at least one light source, typically deployed to illuminate a spatial light modulator, such as an LCOS chip. The spatial light modulator modulates the projected intensity of each pixel of the image, thereby generating an image. Alternatively, the image projector may include a scanning arrangement, typically implemented using a fast-scanning mirror, which scans illumination from a laser light source across an image plane of the projector while the intensity of the beam is varied synchronously with the motion on a pixel-by-pixel basis, thereby projecting a desired intensity for each pixel. In both cases, collimating optics are provided to generate an output projected image which is collimated to infinity. Some or all of the above components are typically arranged on surfaces of one or more polarizing beam-splitter (PBS) cube or other prism arrangement, as is well known in the art.

Optical coupling of image projector 14 to LOE 12 may be achieved by any suitable optical coupling, such as for example via a coupling prism with an obliquely angled input surface, or via a reflective coupling arrangement, via a side edge and/or one of the major external surfaces of the LOE. Details of the coupling-in configuration are not critical to the invention, and are shown here schematically as a non-limiting example of a wedge prism 15 applied to one of the major external surfaces of the LOE.

It will be appreciated that the near-eye display 10 includes various additional components, typically including a controller 22 for actuating the image projector 14, typically employing electrical power from a small onboard battery (not shown) or some other suitable power source. It will be appreciated that controller 22 includes all necessary electronic components such as at least one processor or processing circuitry to drive the image projector, all as is known in the art.

Figure 2A:
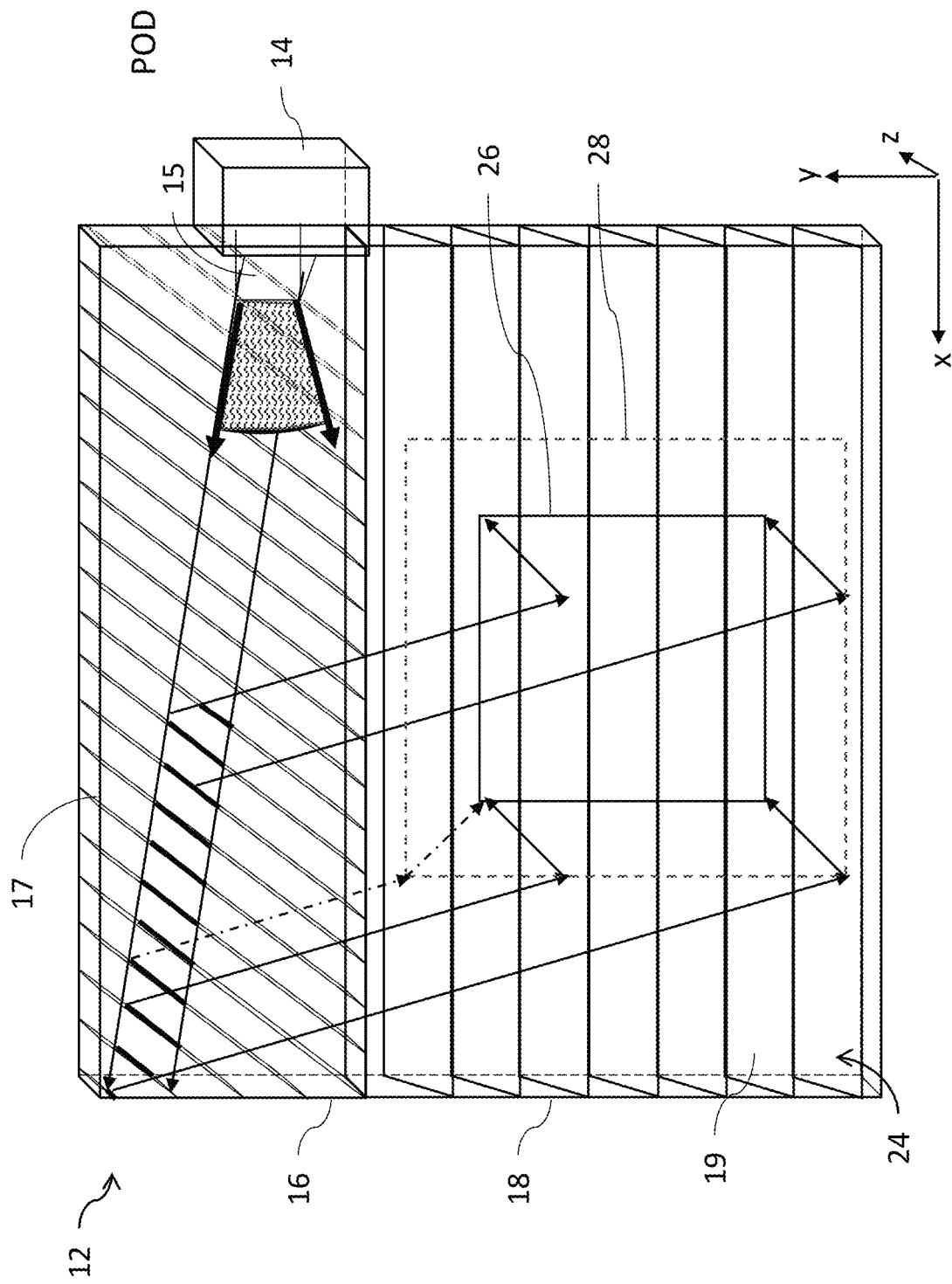
FIGS. 2A and 2B are enlarged schematic isometric views of an LOE from FIG. 1A or 1B showing ray paths for two extreme fields of an image.
Figure 2B:
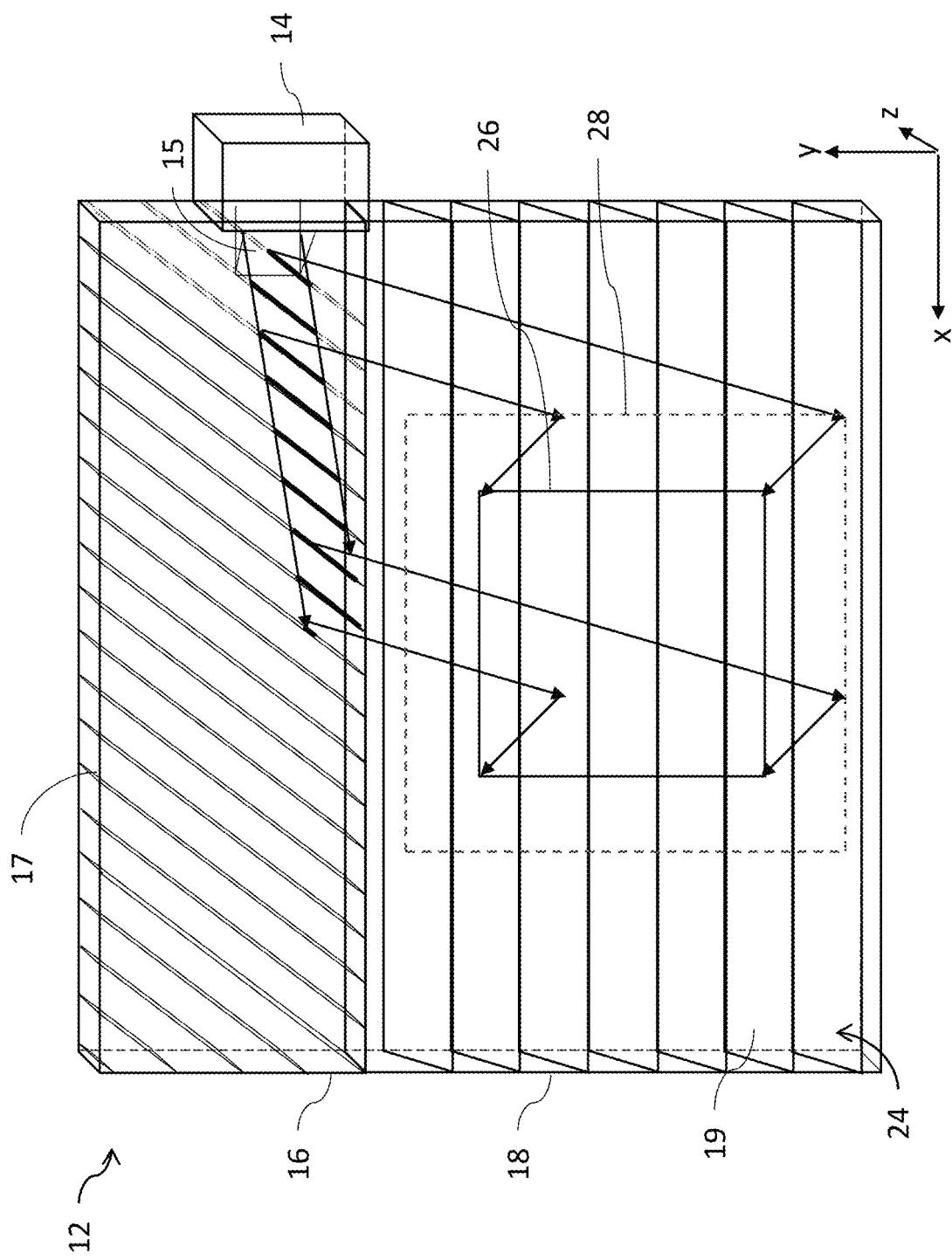

Turning now to FIGS. 2A and 2B, the optical properties of an implementation of the near-eye display are illustrated in more detail. Specifically, there is shown a more detailed view of a light-guide optical element (LOE) 12 formed from transparent material, including a first region 16, also referred to herein as "LOE1", containing a first set of planar, mutually-parallel, partially-reflecting surfaces 17 having a first orientation, and a second region 18, also referred to herein as "LOE2", containing a second set of planar, mutually-parallel, partially-reflecting surfaces 19 having a second orientation non-parallel to the first orientation. A set of mutually-parallel major external surfaces 24 extend across the first and second regions 16 and 18 such that both the first set of partially-reflecting surfaces 17 and the second set of partially-reflecting surfaces 19 are located between the major external surfaces 24. Most preferably, the set of major external surfaces 24 are a pair of surfaces which are each continuous across the entirety of first and second regions 16 and 18, although the option of having a set down or a step up in thickness between the regions 16 and 18 also falls within the scope of the present invention. Regions 16 and 18 may be immediately juxtaposed so that they meet at a boundary, which may be a straight boundary or some other form of boundary, or there may be one or more additional LOE region interposed between those regions, to provide various additional optical or mechanical function, depending upon the particular application. Although the present invention is not limited to any particular manufacturing technique, in certain particularly preferred implementations, particularly high quality major external surfaces are achieved by employing continuous external plates between which the separately formed regions 16 and 18 are sandwiched to form the compound LOE structure. Considerations regarding this option, and the thickness of these plates, will be discussed further below.

The optical properties of the LOE may be understood by tracing the image illumination paths backwards. The second set of partially-reflecting surfaces 19 are at an oblique angle to the major external surfaces 24 so that a part of image illumination propagating within the LOE 12 by internal reflection at the major external surfaces from the first region 16 into the second region 18 is coupled out of the LOE towards an eye-motion box 26. The first set of partially-reflecting surfaces 17 are oriented so that a part of image illumination propagating within the LOE 12 by internal reflection at the major external surfaces from the coupling-in region (coupling prism 15) is deflected towards the second region 18.

One dimension of the angular spread of the projected image from image projector 14 is represented in FIG. 2A by the cone of illumination spreading from the POD aperture on the right side of the LOE towards the left side of the LOE. In the non-limiting example illustrated here, the central optical axis of the POD defines a direction of propagation within the LOE aligned with the X axis, and the angular spread (within the LOE) is roughly ±16°. (It should be noted that the angular FOV becomes larger in air due to the change in refractive index.) The first set of partially-reflecting surfaces 17 are illustrated in first region 16, and the second set of partially-reflecting surfaces 19 are illustrated in second region 18.

The near-eye display is designed to provide a full field-of-view of the projected image to an eye of the user that is located at some position within the permitted range of positions designated by an "eye-motion box" (EMB) 26 (that is, a shape, typically represented as a rectangle, spaced away from the plane of the LOE from which the pupil of the eye will view the projected image). In order to reach the eye-motion box, light must be coupled-out from the second region 18 by the second set of partially-reflecting surfaces 19 towards the EMB 26. In order to provide the full image field-of-view, each point in the EMB must receive the entire angular range of the image from the LOE. Tracing back the field-of-view from the EMB indicates a larger rectangle 28 from which relevant illumination is coupled-out of the LOE towards the EMB.

FIG. 2A illustrates a first extremity of the field of view, corresponding to the bottom-left pixel of the projected image. A beam of a width corresponding to the optical aperture of the projector as coupled into the LOE is shown propagating leftwards and upwards from the POD and being partially reflected from a series of partially-reflecting surfaces 17. As illustrated here, only a subset of the facets generate reflections that are useful for providing the corresponding pixel in the image viewed by the user, and only a sub-region of those facets contributes to the observed image of this pixel. The relevant regions are illustrated by heavy black lines, and the rays corresponding to this pixel in the redirected image reflected from facets 17 and then coupled-out by facets 19 reaching the four corners of the EMB 26 are shown. Here and throughout the description, it will be noted that only the in-plane propagation directions of the rays are illustrated here during propagation within the LOE, but the rays actually follow a zigzag path of repeated internal reflection from the two major external surfaces, and one entire dimension of the image field of view is encoded by the angle of inclination of the rays relative to the major external surfaces, corresponding to the pixel position in the Y dimension. By way of one additional example, deflected and coupled-out rays corresponding to the top-left extremity of the image as viewed at the top-left corner of the EMB are shown in dash-dot lines.

FIG. 2B illustrates the same configuration as FIG. 2A, but here shows the rays corresponding to the bottom-right pixel of the field-of-view reaching the four corners of the EMB, again with the relevant regions of the relevant partially-reflecting surfaces 17 denoted by a heavy line.

It will be apparent that, by additionally tracing correspond ray paths for all fields (directions or pixels) of the image reaching all regions of the EMB, it is possible to map out an envelope of all ray paths from the coupling-in region propagating within the LOE, deflected by one of the first set of partially-reflecting surfaces and coupled out by one of the second set of partially-reflecting surfaces in a direction reaching the eye-motion box, and this envelope defines an "imaging area" of each facet 17 which is needed for deflecting part of the image illumination which contributes to the image reaching the EMB, while the remainder of the facet 17 lying outside the envelope is a "non-imaging area" which does not contribute to the required image. Optionally, the in-plane extent of the facets may be truncated to cover only the imaging area. This and other variant embodiments, employing differing imaging injection locations and geometries, non-uniform facet spacing, or introducing additional (e.g., third) sets of partially-reflecting internal surfaces, are discussed in detail in prior publications by Lumus Ltd. (Israel), particularly in the aforementioned PCT publication no. WO 2020/049542, as well as PCT publication no. WO 2020/152688 and PCT application number PCT/IL2020/051354, both of which were unpublished as of the priority date of this application, and are not considered prior art. These additional features may all be implemented in the context of the present invention, but for conciseness, they will not be addressed here in detail.

It is a particularly preferred feature of certain embodiments of the present invention that the first set of partially-reflecting surfaces 17 extend across at least 95 percent of a thickness of the LOE, while the second set of partially-reflecting surfaces 19 in the second region 18 are contained within a subsection of the thickness spanning less than 95 percent of the thickness, so that the second set of partially-reflecting surfaces 19 are excluded from at least one surface layer of the second region 18. The advantages of this combination will now be presented.

In a matter of terminology, the term "cover plate" is used herein to refer generically to any implementation of a layer of a certain depth adjacent to one or both of the major surfaces of an LOE from which the sets of internal partially-reflecting surfaces of the LOE are excluded. One approach to forming such a layer is by attachment of a sheet of transparent material, i.e., a physically-distinct cover plate, to the LOE component. However, other production techniques are also possible, such as by generating the LOE structure from a stack of plates in which the partially-reflecting coating is applied only in regions corresponding to the active LOE layer, and the regions which will be adjacent to the major external surfaces of the LOE are joined with index-matched adhesive without reflective coatings. The term "cover plate" is used independent of the production technique to refer to the functional structure in which a surface layer functions as a cover plate, without facets, no matter how that layer is formed.

Figure 3:
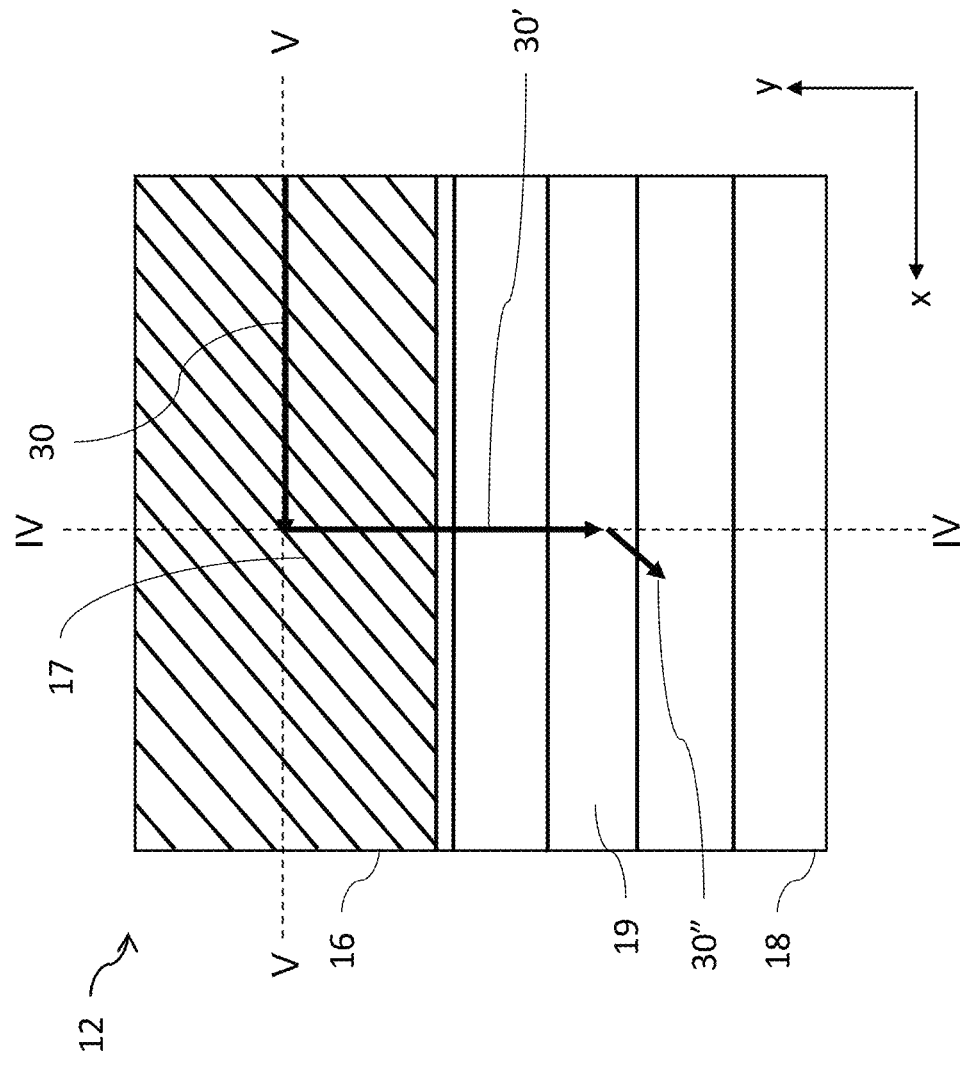
FIG. 3 is a schematic front view of the LOE of FIGS. 2A and 2B showing the path of a principal ray propagating through the LOE and undergoing a first redirection within the LOE, and a second redirection for coupling out of the LOE towards a viewer.

Referring to FIG. 3, this illustrates the path of a single ray 30, here the principal ray corresponding to the center of field of the image in the X dimension, as it traverses part of LOE1, is redirected by reflection at one of the partially-reflecting surfaces 17 towards LOE2 (ray 30'), and is redirected and coupled-out by reflection at one of the partially-reflecting surfaces 19 towards the viewer (ray 30"). FIGS. 4A and 4B illustrate the geometry of the second redirection/coupling-out in cases without and with face plates added to the LOE, while FIGS. 5A and 5B illustrate the geometry of the first redirection.

In LOE2 (region 18) from which the image is coupled-out towards the viewer, obliquely inclined facets are used. When facets are inclined (for example at 25 degrees to the major external surfaces), rays can be reflected twice from the same facet as illustrated in FIG. 4A. This results in a non-uniform beam exiting the waveguide. A darker area is generated by the second reflection. The dark stripes then appear on the waveguide exit pupil. For a viewer, this will result in a dark stripe on the far field image.

FIG. 4B illustrates how this double reflection can be avoided by adding a cover plate 32 to the waveguide on one or both external faces, resulting in the facets effectively being spaced away from the external surfaces of the waveguide. In this manner, after being reflected once by a facet, the transmitted portion of the rays will jump over or under it, propagating directly to the next facet, thereby resulting in enhanced image uniformity.

It has been found, however, that the considerations for achieving image uniformity in LOE1 are significantly different from those of LOE2 regarding the use of a cover plate. Since the partially-reflecting surfaces used for redirecting the image illumination from one direction guided within the waveguide to another guided direction are necessarily much steeper, and in some embodiments orthogonal to the major external surfaces of the waveguide, the rays are not reflected twice by a single facet. In this case, optimal image uniformity would be achieved by use of facets which span the entirety of the thickness of the substrate (FIG. 5A), whereas facets which fall short of the surfaces have been found to allow certain rays to skip a facet altogether (FIG. 5B), resulting in dark lines in the output image. The overall result of providing the structure with cover plates over the entirety of both regions 16 and 18 is illustrated schematically in FIG. 6A, where a uniformly illuminated input aperture 34 from the image projector propagates through the LOE and is coupled out towards the eye-motion box (EMB) 26 as image regions 36 disrupted by dark lines 38 in the output. In contrast, the structure of FIG. 6B employs cover plates only on LOE2 18, while the facets of LOE1 16 extend to the major external surfaces of the device. In this case, a uniform injected image 34 from the image projector preferably results in a relatively uniform image 36 as perceived by the viewer.

Although the presence of cover plates in the LOE1 region 16 adversely impacts output image quality, there may be practical considerations that favor the use of a cover plate on one or both major surfaces of the LOE1 region 16. For example, the absence of any glued joints extending to the external surface may make it easier to achieve a high-quality planar outer surface of the waveguide. The presence of cover plates may be acceptable if they are sufficiently thin that any resulting disruption of the image is non-troubling to the human eye (FIG. 6C). A thin cover plate will generate thin dark stripes where the output image is missing. The spatial frequency and the width of the dark stripes determine their visibility and impact on the image as perceived by the human eye. To correctly evaluate the severity of the unfilled stripes for the human eye, a convolution of the human eye pupil over the waveguide exiting pupil shows us what cover plate thickness should be allowed. If the spatial frequency of the dark stripes is significantly higher than the diameter of the pupil of the eye, the variations will inherently be averaged out by the eye. If the spatial frequency is lower, the stripes may still be acceptable if they are narrow enough that the intensity averaged over the pupil size does not vary greatly.

Practically, the thickness range for a cover plate for LOE1 region, if present, should be from 1 to 100 microns, most preferably less than 50 microns. As a proportion of the thickness of the LOE, the total thickness of the cover plates is preferably less than 5% of the thickness, preferably no more than 4% of the thickness, and most preferably no more than 2% of the thickness. This corresponds to the first set of partially-reflecting surfaces extend across (spanning) at least 95 percent of the thickness, more preferably at least 96 percent of the thickness, and most preferably at least 98 percent of the thickness. The dark stripe issue can be ameliorated by using a cover plate on only one side of LOE1 region 16, as illustrated schematically in FIG. 6D.

Notwithstanding the possible advantages of employing cover plates, in certain particularly preferred implementations of the present invention, the first set of partially-reflecting surfaces 17 extend across an entirety of the thickness of LOE1 16, i.e., with no cover plate, as illustrated schematically in FIG. 6B.

Regarding LOE2 in region 18, as discussed above, the cover plates in this region contribute to a reduction in non-uniformity of illumination, thereby improving the quality of the viewed image. The second set of partially-reflecting surfaces 19 are preferably excluded from surface layers of both of the major external surfaces in the second region, meaning that both major faces have "cover plates". The total thickness of the surface layers of second region 18 from which the second set of partially-reflecting surfaces 19 are excluded is preferably between 6 percent and 33 percent of the total thickness of the LOE2.

Figure 7:
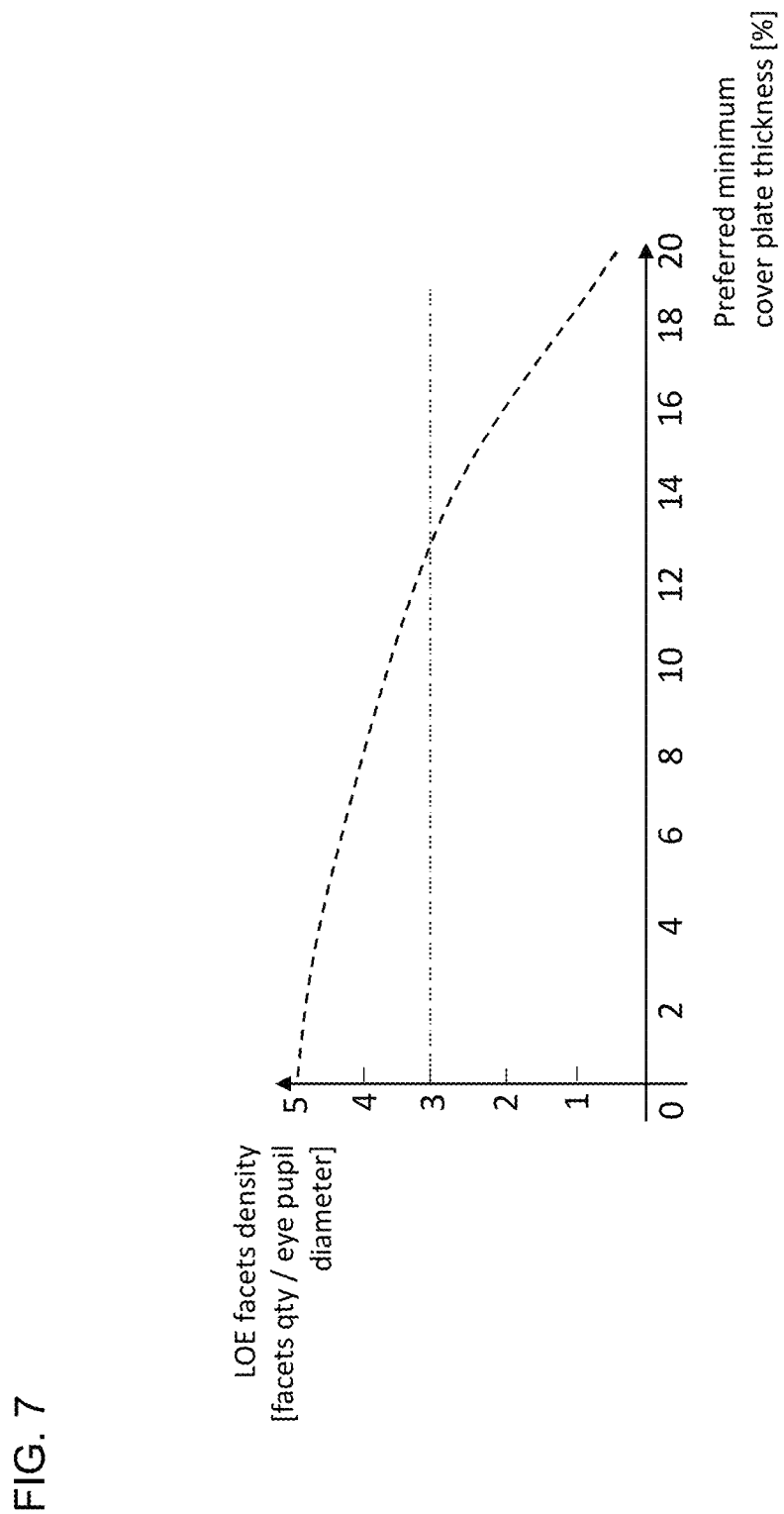
FIG. 7 is a schematic graph illustrating a relationship between a spatial density of LOE partially-reflecting surfaces and a preferred minimum thickness of a cover plate of the second region of LOE.

Here too, the extent to which non-uniformities in the illumination are perceived by the human eye is dependent on the spatial frequency of the intensity variations, their dynamic range and their width, which in turn dictates the preferred thickness of the cover plates that will be effective to ameliorate those variations. In the case of the coupling-out facets 19, the spatial frequency results directly from the spacing between adjacent surfaces of the second set of partially-reflecting surfaces 19 in a direction parallel to the major external surfaces. FIG. 7 illustrates a preferred minimum cover plate thickness (total sum of the cover plate thicknesses as a percentage of the total LOE2 thickness) for various facet densities, defined here as the number of facets overlapping a pupil diameter, which is taken here to be roughly 3 millimeters. It can be seen that, for high facet density, a relatively thin cover plate is sufficient, since the intensity variations are inherently averaged over the pupil area and are therefore perceived less by the viewer. As the facet spacing increases, the spatial frequency of the intensity variations is reduced, and a thicker cover plate is required to compensate for these variations.

As a useful point of reference, indicated by a horizontal dashed line in FIG. 7, when the spacing between adjacent surfaces of the second set of partially-reflecting surfaces 19 in a direction parallel to the major external surfaces is at least 1 mm (corresponding to a density of 3 facets per 3 millimeter pupil diameter), the total thickness of the surface layer(s) of the second region from which the second set of partially-reflecting surfaces are excluded is preferably at least 10 percent of the total thickness.

The optical systems according to the present invention may be produced by various processes based on standard manufacturing techniques employed in this field, as will be clear to a person ordinarily skilled in the art. Each LOE region is typically formed by bonding together a stack of thin plates which have been coated on one or both faces (typically all coated on one face, or alternate plates coated on both sides) to provide the desired partially-reflecting properties for each interface. The partially-reflecting properties are typically provided by multi-layer dielectric coatings, which can offer angularly-selective reflectivity, as is well-known in the art. These stacks are then sliced at the required angle so as to produce an LOE section/region with correctly oriented internal partially-reflecting surfaces. Cover plates of appropriate thickness are then added to each region, where required, and edge surfaces of the LOE sections are polished and then bonded together to form the final compound LOE.

Optionally, where a cover plate is to be provided on one or both major surfaces of the LOE1, it may be advantageous to produce LOE2 with cover plates of partial thickness, corresponding to the desired final cover plate thickness minus the cover plate thickness required for LOE1. A single continuous cover plate can then be added during assembly of the compound LOE, which provides the total desired cover plate thickness for LOE1 and supplements the cover plate thickness for LOE2 up to the desired thickness. This option is addressed further below with reference to FIGS. 9A and 9B.

Alternatively, in some cases, it may be desirable to produce a stepped cover plate which has a first part of a first thickness suited to LOE1 and a second part with a (larger) second thickness suited to LOE2. The step between the two parts can then be used as an alignment feature for assembly of the two LOE sections.

Figure 8B:
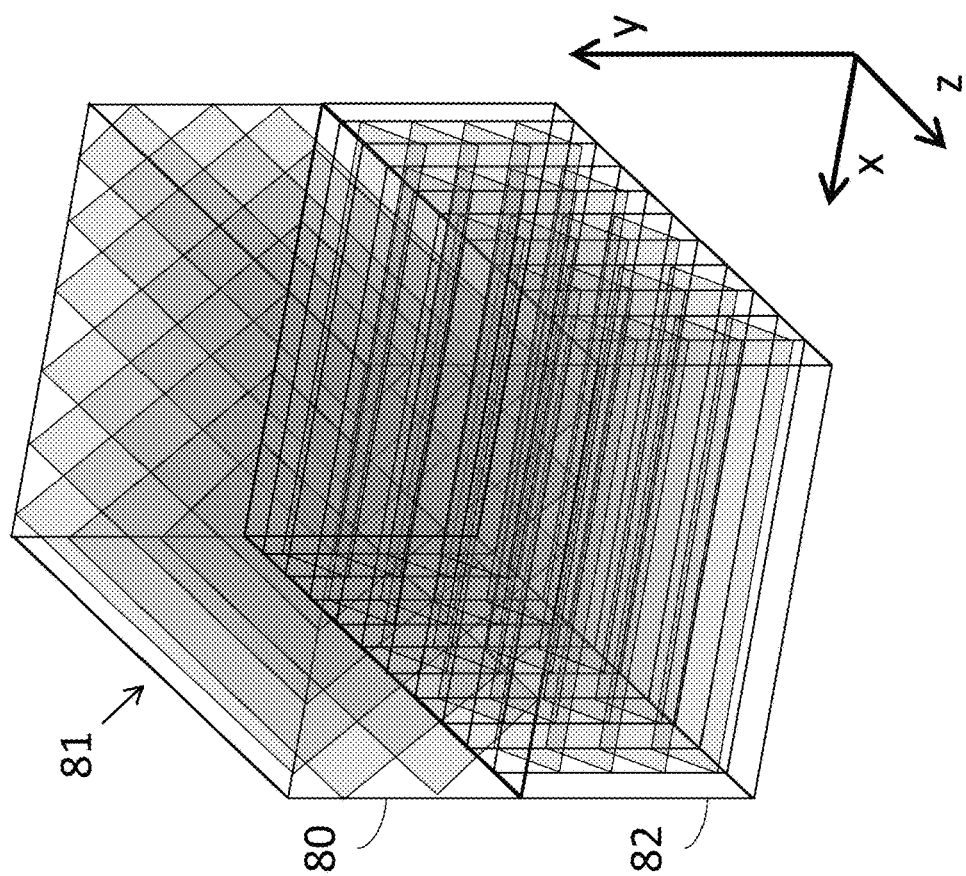
FIGS. 8A and 8B are a side view and an isometric view, respectively, of an intermediate work product during a manufacturing process for an LOE according to certain embodiments of the present invention.
Figure 8A:
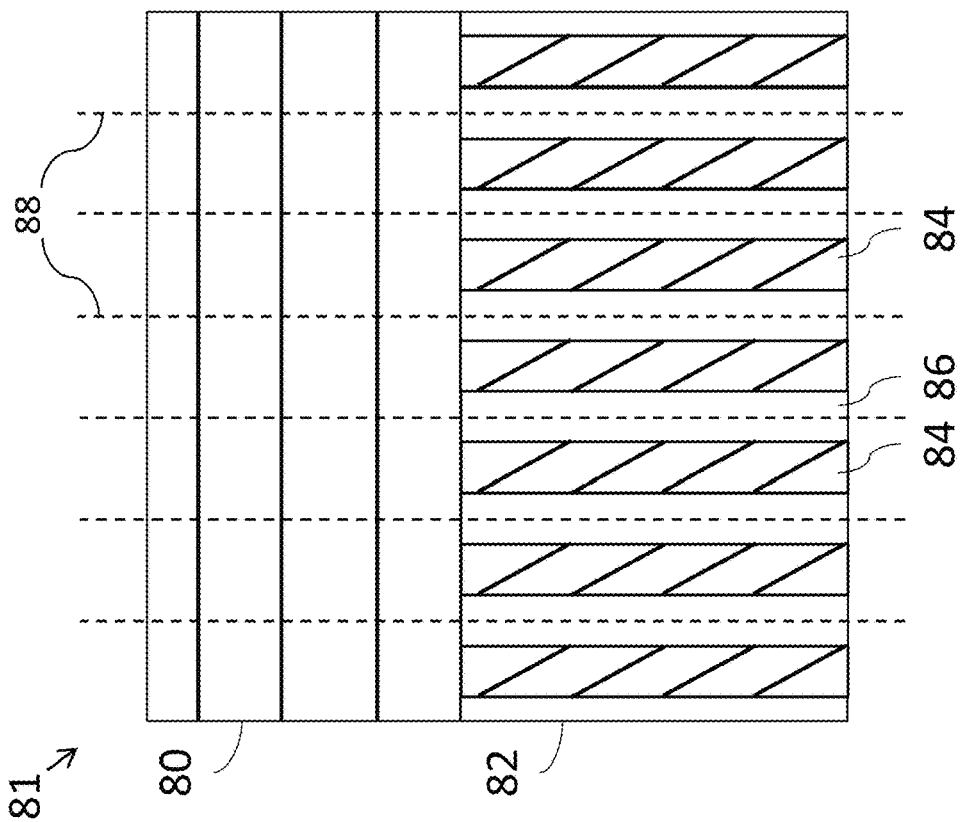

A further option for manufacture of the compound LOE of the present invention is illustrated schematically in FIGS. 8A and 8B. In this case, a stack of plates for forming LOE1 is cut to form a block 80 of dimensions corresponding to multiple LOEs. A second block 82 is formed by combining a plurality of active layers 84 of LOE2 (i.e., the section of the LOE which contains the partially-reflecting surfaces) bonded together with intermediate transparent plates 86. First and second blocks 80 and 82 are then bonded together to form an intermediate work product 81, as illustrated in FIGS. 8A and 8B, which can be sliced along slicing planes 88 and polished to generate a plurality of compound LOEs, where a part of the thickness of intermediate transparent plates 86 becomes a cover sheet for the second LOE region 18 of each compound LOE.

The manufacturing technique of FIGS. 8A and 8B, and variants thereof, are discussed in further detail in a co-pending PCT application entitled "Method of Fabrication of Compound Light-Guide Optical Elements", filed on the same day as this application, taking priority from U.S. provisional patent application No. 63/029,500 that was filed 24 May 2020.

Here too, if it is desired to have a cover plate also on first LOE region 16, it may be advantageous to generate the compound LOE structure according to FIGS. 8A and 8B where the cover plate 32a of region 18 is smaller than the desired thickness by an amount equal to the thickness desired for region 16, as shown in FIG. 9A. Both cover plates can then be brought to their intended total thickness by addition of a uniform-thickness plate 32b bonded to the waveguide across the entire structure, thereby producing the final structure as illustrated in FIG. 9B.

It will be appreciated that the above descriptions are intended only to serve as examples, and that many other embodiments are possible within the scope of the present invention as defined in the appended claims.

What is claimed is:

1. An optical system for directing image illumination injected at a coupling-in region towards a user for viewing, the optical system comprising a light-guide optical element, LOE, formed from transparent material, said LOE comprising:
   (a) a first region containing a first set of planar, mutually-parallel, partially-reflecting surfaces having a first orientation;
   (b) a second region containing a second set of planar, mutually-parallel, partially-reflecting surfaces having a second orientation non-parallel to said first orientation;
   (c) a pair of mutually-parallel planar major external surfaces, said major planar external surfaces extending across said first and second regions such that both said first set of partially-reflecting surfaces and said second set of partially-reflecting surfaces are located between said planar major external surfaces and
   wherein said first orientation of said first set of partially-reflecting surfaces is orthogonal to said planar major external surfaces,
   wherein said second set of partially-reflecting surfaces are at an oblique angle to said planar major external surfaces so that a part of image illumination propagating within said LOE by internal reflection at said planar major external surfaces from said first region into said second region is coupled out of said LOE towards the user, and wherein said first set of partially-reflecting surfaces are oriented so that a part of image illumination propagating within said LOE by internal reflection at said planar major external surfaces from said coupling-in region is deflected towards said second region,
   wherein said LOE has a thickness between said planar major external surfaces, and wherein said first set of partially-reflecting surfaces extend across at least 95 percent of said thickness, and said second set of partially-reflecting surfaces in said second region are contained within a subsection of said thickness spanning less than 95 percent of said thickness so that said second set of partially-reflecting surfaces are excluded from at least one surface layer of said second region.

2. The optical system of claim 1, wherein said second set of partially-reflecting surfaces are excluded from surface layers of both of said planar major external surfaces in said second region.

3. The optical system of claim 1, wherein a total thickness of said at least one surface layer of said second region from which said second set of partially-reflecting surfaces are excluded is between 6 percent and 33 percent of said thickness.

4. The optical system of claim 1, wherein a spacing between adjacent surfaces of said second set of partially-reflecting surfaces in a direction parallel to said planar major external surfaces is at least 1 mm, and wherein a total thickness of said at least one surface layer of said second region from which said second set of partially-reflecting surfaces are excluded is at least 10 percent of said thickness.

5. The optical system of claim 1, wherein said first set of partially-reflecting surfaces extend across at least 96 percent of said thickness.

6. The optical system of claim 1, wherein said first set of partially-reflecting surfaces extend across at least 98 percent of said thickness.

7. The optical system of claim 1, wherein said first set of partially-reflecting surfaces extend across an entirety of said thickness.

* * * * *